United States Patent [19]
Tsai

[11] Patent Number: 5,935,691
[45] Date of Patent: Aug. 10, 1999

[54] METAL DUAL-COLOR EXTRUDED PLASTIC KEY

[75] Inventor: Jason Tsai, Taipei Hsien, Taiwan

[73] Assignee: Silitek Corporation, Taipei, Taiwan

[21] Appl. No.: 08/915,175

[22] Filed: Aug. 20, 1997

[51] Int. Cl.$^6$ ........................................................ B32B 9/00
[52] U.S. Cl. .......................... 428/195; 428/341; 428/412; 428/424.2; 428/425.8; 428/457; 428/463; 428/469; 428/518; 428/520; 427/135; 427/304; 427/447; 427/455
[58] Field of Search ...................................... 428/458, 462, 428/195, 424.2, 424.6, 425.8, 463, 518, 520, 341, 457, 469, 412; 427/447, 135, 455, 304

[56] References Cited

U.S. PATENT DOCUMENTS

| | | | |
|---|---|---|---|
| 4,305,981 | 12/1981 | Muroi et al. | 428/31 |
| 4,898,765 | 2/1990 | Sato et al. | 428/195 |
| 5,166,003 | 11/1992 | Makinae et al. | 428/458 |
| 5,585,177 | 12/1996 | Okamura et al. | 428/341 |

*Primary Examiner*—Deborah Jones
*Assistant Examiner*—Abraham Bahta
*Attorney, Agent, or Firm*—Rosenberg, Klein & Bilker

[57] ABSTRACT

The subject invention relates to a type of metal dual-color extruded plastic key; said key comprising an electroplatable plastic material and a non-electroplatable plastic material; said two parts being subjected to plastic dual-color extrusion forming process; said non-electroplatable plastic material serving to produce a letter or figure; the area surrounding said non-electroplatable plastic material being the electroplatable plastic material; the surface of said electroplatable material being a layer of light-proof electroplated coating, to form the required metal surface; whereby the non-electroplatable plastic material being used to form the area where the letter or figure is to appear, so the lighting could permeate from the letter or figure; the above structure is so designed to provide a high added value to the key product with an exterior of excellent light permeability and comfortable touch.

5 Claims, 3 Drawing Sheets

METAL DUAL-COLOR EXTRUDED PLASTIC KEY

BACKGROUND OF THE INVENTION

The subject invention relates to a type of a type of metal dual-color extruded plastic key, particularly to one with the combination of two processing skills of plastic extrusion and electroplating, to produce a high added value key product with even gloss, excellent back lighting and smooth metal touch, that can be applied to such equipment as audio, hi-fi stereo set, air conditioners on automobiles, electronic products or switch button on automobiles, or graduated scales, etc.

DESCRIPTION OF PRIOR ART

Conventionally, a prior art of key product with light-permeable and back lighting effects is normally made by a laser engraving process. In such conventional laser processing technology, however, the light permeable key surface could not achieve such effects as metal-like even gloss and smooth touch.

SUMMARY OF THE INVENTION

The primary purpose of the subject invention is to provide a type of metal dual-color extruded plastic key; based on plastic dual-color extrusion principle, whereby a type of electroplatable plastic material and another type of non-electroplatable plastic material are extruded to form one finished product; the non-electroplatable plastic material is used on the area to produce a letter or figure, followed by the plating process; the area outside the letter or figure is electroplated to form the required metal surface, to produce desired letter and pattern; to enable the light to permeate from the letter or figure, to achieve such effects as back lighting, high added value, excellent light permeability and comfortable touch on its exterior.

To enable better understanding of the characteristics and technical contents of the subject invention, please refer to the following detailed description with drawings; however, the attached drawings are only for the purposes of reference and description, which shall not be based to restrict or limit the subject invention:

BRIEF DESCRIPTION OF NUMERALS 1 electroplatable plastic material
2 non-electroplatable plastic material
3 light-proof plated coating

DETAILED DESCRIPTION OF PREFERRED EMBODIMENT

Figure 1:
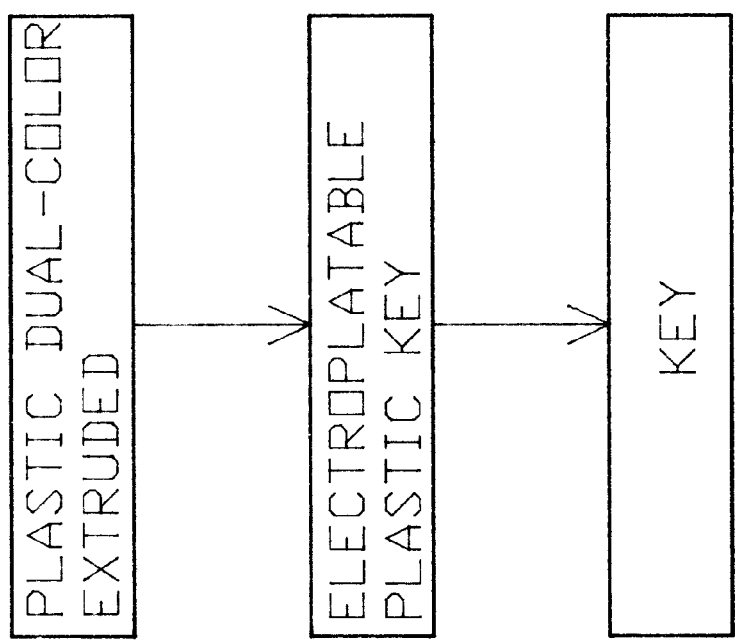
FIG. 1 is a production flow chart of the subject invention of key.

Please refer to FIG. 1 which is a production flow chart of the subject invention. The subject invention relates to the providing of a metal dual-color extruded plastic key; said key comprising an electroplatable plastic material 1 and a non-electroplatable plastic material 2; whereby, based on the plastic dual-color extrusion principle, a type of electroplatable plastic material 1, such as ABS resin, and another type of non-electroplatable plastic material 2, such as PC, are extruded to form a key product (refer to FIGS. 2 and 3); said non-electroplatable plastic material 2 can be coated in colors as required (such as: yellow, red, blue, green, etc.) for the letter or figure on the mold, to be projected on the area where the letter or figure is to be produced; the electroplatable plastic material 1 (natural color or dyed color) is projected on the surrounding area of the letter or figure; then, on the surface plating is applied with a layer of light-proof electroplated coating 3; so the electroplatable plastic material 1 is plated to have the required metal surface; thus to obtain a metal dual-color extruded plastic key product with a light-insulating function and a back-lighting function.

To achieve an excellent back lighting effect, the subject invention will provide the following processing alternatives:

1. Said electroplatable plastic material 1 is subjected to electroplating process without the process of being colored; so the lighting at the bottom is insulated, instead of penetrated.
2. Said electroplatable plastic material 1 is subjected to coloring process before it is plated; so the lighting at the bottom is insulated, instead of penetrated.
3. Alternatively, the non-electroplatable plastic material 2 can be dyed to a required color, to achieve the required lightproof effect.

Figure 2:
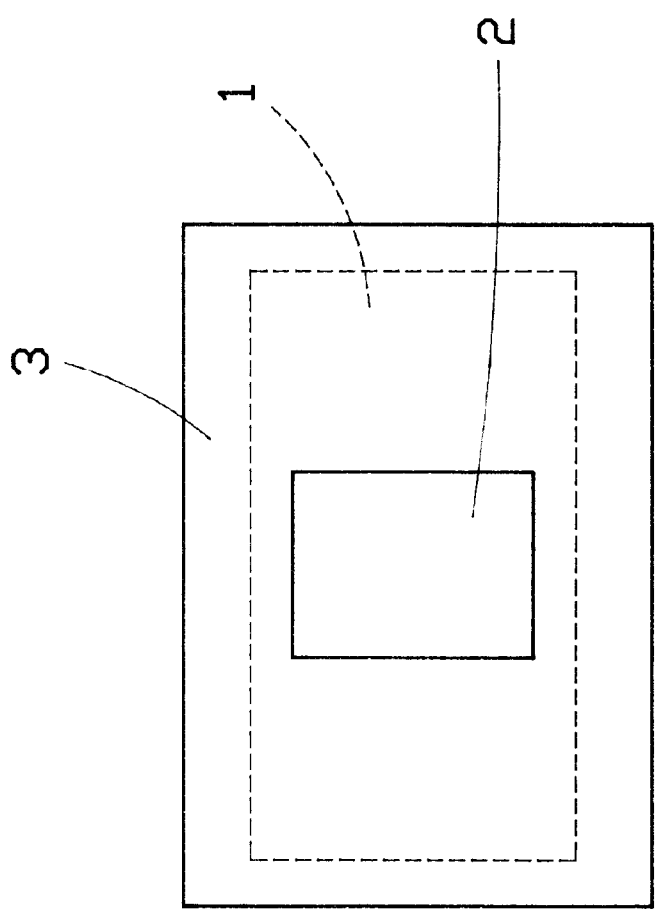
FIG. 2 is a top view of the subject invention.
Figure 3:
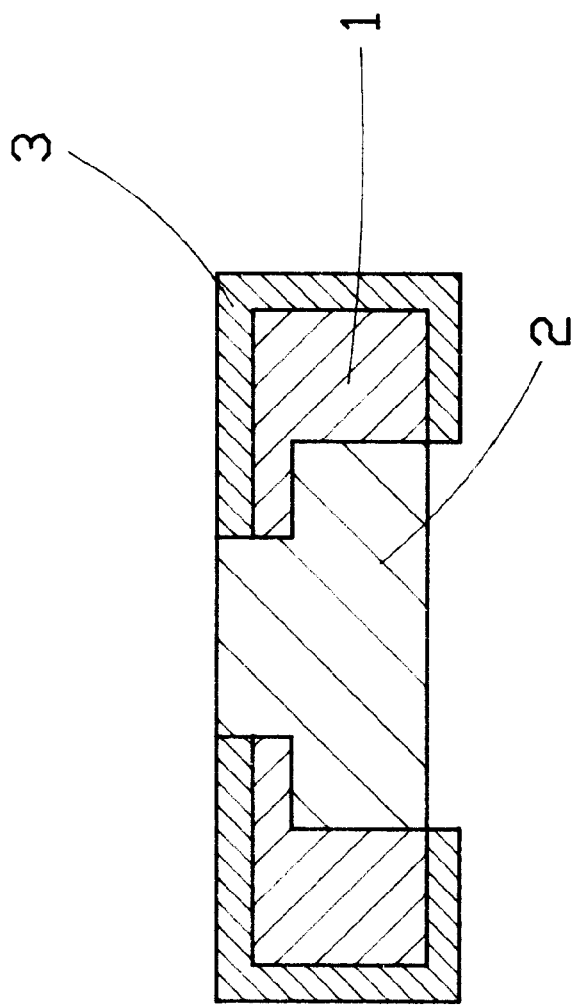
FIG. 3 is a section view of the subject invention of key product.

Please refer to FIGS. 2 and 3 which are the top view and sectional view of the subject invention of metal dual-color extruded plastic key. The non-electroplatable plastic material 2 is coated in required color, and projected to the letter or figure area on the mold; then, the electroplatable plastic material 1 is projected to the surrounding area of the letter or figure; then, the surface is applied with a layer of light-proof electroplated coating 3, to produce a hard head of a key with a good metal-quality feeling, with a surface that gives the feeling of even and smooth metal-like gloss; with the coordination of bottom lighting source (not shown in diagram) that sends out light rays from the bottom, thus achieving the so-called back lighting effect; so that the user can clearly see the letter or figure on each key during nighttime operation; so as to provide a high added-value exterior with excellent light permeability and comfortable touch.

Summing up, the subject invention, with improvement on such weaknesses as failure of metal-like even gloss and smooth touch in conventional light-permeable and back-lighting keys, is indeed an unprecedented creation with its inventive step and originality that will fully satisfy the qualifications for a patent right; hence this application is filed in accordance with the Patent Law to protect the subject inventor's rights and interests. Your favorable consideration should be appreciated.

It is hereby declared that the above description, covering the preferred embodiment, should not be based to limit or restrict the subject claim, and that all equivalent structural and/or configurational variations and/or modifications deriving from the subject description with drawings and contents therein, should reasonably be included in the intent of the subject invention and the subject claim.

I claim:

1. A plastic key comprising:
   (a) a non-electroplatable plastic member formed of a polycarbonate composition, said non-electroplatable plastic member having a rear surface through which light passes, a front surface and a pair of opposing side surfaces;
   (b) an electroplatable plastic member having exterior surfaces formed of an ABS composition, said electroplatable plastic member being co-extruded with said non-electroplatable plastic member and matingly formed contiguous with said side surfaces of said non-electroplatable plastic member; and, (c) a metal layer electroplated to said exterior surfaces of said electroplatable plastic member, said metal layer being opaque whereby said light passes from said non-electroplatable plastic member rear surface through a portion of said front surface of said non-electroplatable plastic member.

2. The plastic key as recited in claim 1 where said non-electroplatable plastic member is at least translucent.

3. The plastic key as recited in claim 1 where said non-electroplatable plastic member is substantially transparent.

4. The plastic key as recited in claim 1 where said non-electroplatable plastic member includes a first color coating on at least said rear surface.

5. The plastic key as recited in claim 1 where said electroplatable plastic member includes a second color coating on at least a portion of said exterior surfaces.

* * * * *